United States Patent
Patel et al.

(10) Patent No.: US 10,839,251 B2
(45) Date of Patent: Nov. 17, 2020

(54) METHOD AND SYSTEM FOR IMPLEMENTING IMAGE AUTHENTICATION FOR AUTHENTICATING PERSONS OR ITEMS

(71) Applicant: Rank One Computing Corporation, Denver, CO (US)

(72) Inventors: Keyurkumar K. Patel, Parker, CO (US); Scott J. Klum, Denver, CO (US); Joshua C. Klontz, Denver, CO (US); Brendan F. Klare, Denver, CO (US)

(73) Assignee: RANK ONE COMPUTING CORPORATION, Denver, CO (US)

( * ) Notice: Subject to any disclaimer, the term of this patent is extended or adjusted under 35 U.S.C. 154(b) by 154 days.

(21) Appl. No.: 16/018,449

(22) Filed: Jun. 26, 2018

(65) Prior Publication Data

US 2018/0373958 A1 Dec. 27, 2018

Related U.S. Application Data

(60) Provisional application No. 62/524,672, filed on Jun. 26, 2017.

(51) Int. Cl.
*G06K 9/62* (2006.01)
*G06T 7/174* (2017.01)
*G06K 9/00* (2006.01)

(52) U.S. Cl.
CPC ....... *G06K 9/6209* (2013.01); *G06K 9/00899* (2013.01); *G06K 9/6211* (2013.01); *G06K 9/6212* (2013.01); *G06T 7/174* (2017.01)

(58) Field of Classification Search
CPC ............... G06K 9/6209; G06K 9/6212; G06K 9/00899; G06K 9/6211; G06T 7/174
(Continued)

(56) References Cited

U.S. PATENT DOCUMENTS 5,982,932 A 11/1999 Prokoski
6,922,478 B1 7/2005 Konen et al.
(Continued)

OTHER PUBLICATIONS

Chingovska et al., "On the Effectiveness of Local Binary Patterns in Face Anti-spoofing," BIOSIG—Proceedings of the International Conference of the IEEE (2012).
(Continued)

*Primary Examiner* — Ayodeji O Ayotunde
(74) *Attorney, Agent, or Firm* — Adsero IP

(57) ABSTRACT

Novel tools and techniques are provided for implementing image authentication for authenticating persons or items. In various embodiments, a computing system might receive an image (or video stream) from an optical sensor device, might extract image regions from each received image (or each image frame from each image stream), might analyze each image region to identify one or more spatial relationships amongst pixels (and/or groups of pixels) in each image region, might compare each identified spatial relationship amongst (groups of) pixels in each image region with a plurality of spatial relationships amongst (groups of) pixels that are characteristic of particular image artifacts (whether known and/or machine-learned), and might generate authenticity values and/or results for the image based at least in part on results of the analysis and the comparison. The computing system might also analyze a plurality of authentic and inauthentic images to identify distinctions between authentic and inauthentic images.

19 Claims, 9 Drawing Sheets

(58) Field of Classification Search
USPC .......................................................... 382/112
See application file for complete search history.

(56) References Cited

U.S. PATENT DOCUMENTS

| | | |
|---|---|---|
| 8,457,367 B1 | 6/2013 | Sipe et al. |
| 9,202,105 B1 | 12/2015 | Wang et al. |
| 2002/0093645 A1* | 7/2002 | Heacock ................ A61B 3/152 |
| | | 356/138 |
| 2007/0223838 A1 | 9/2007 | Luo |
| 2012/0230536 A1 | 9/2012 | Fridrich |
| 2013/0188840 A1* | 7/2013 | Ma ..................... G06K 9/00221 |
| | | 382/107 |
| 2014/0168445 A1 | 6/2014 | Flir |
| 2014/0270412 A1 | 9/2014 | Ma et al. |
| 2015/0279143 A1 | 10/2015 | De La Rue |

OTHER PUBLICATIONS

Patel et al., "Secure Face Unlock: Spoof Detection on Smartphones," IEEE Transactions on Information Forensics and Security (2016), vol. 11(10):2268-2283.

Määttä et al., "Face Spoofing Detection from Single Images Using Texture and Local Shape Analysis," IET Biometrics (2012), vol. 1(1):3-10.

International Search Report from PCT/US18/39545 dated Sep. 19, 2018.

* cited by examiner

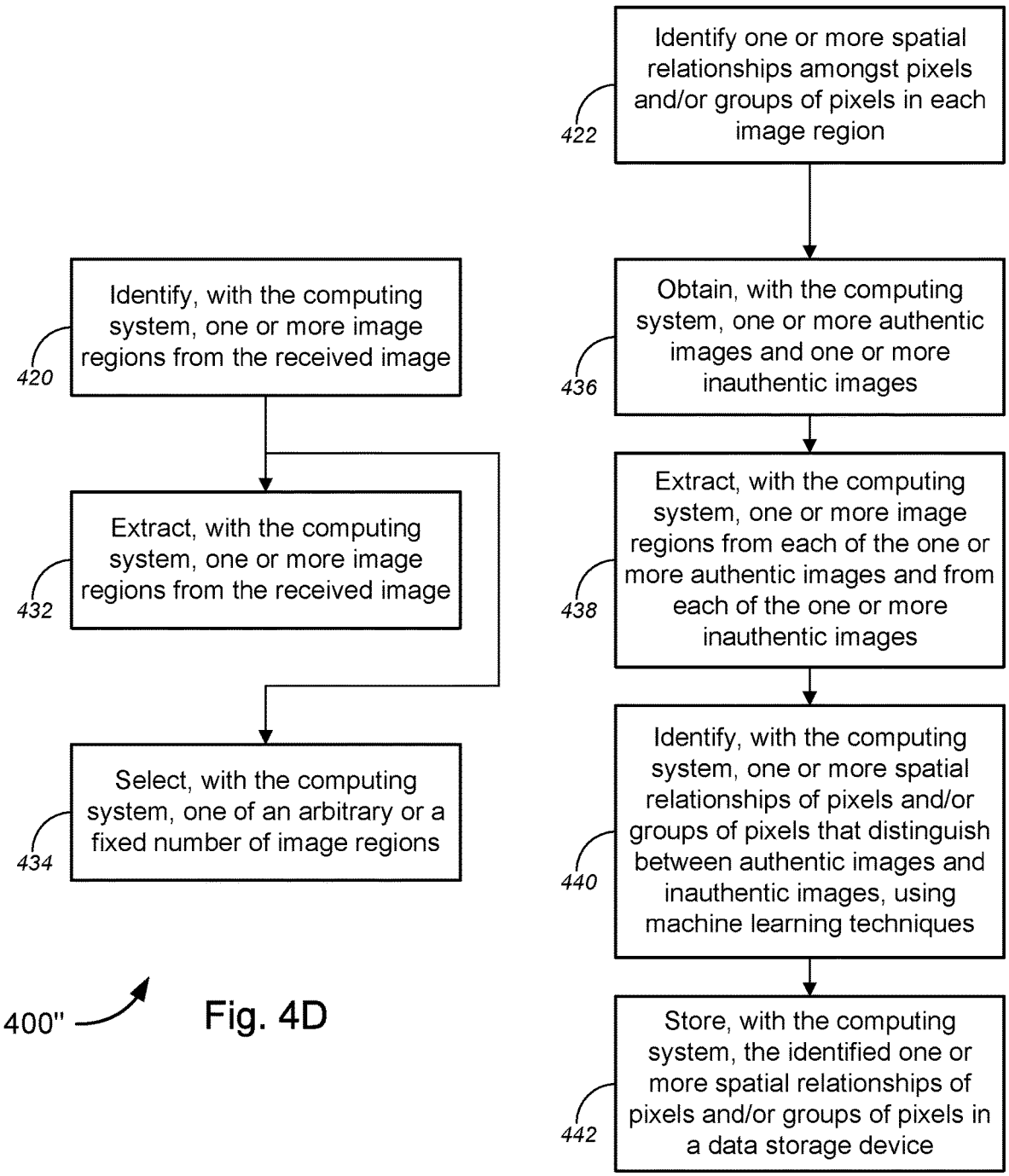

METHOD AND SYSTEM FOR IMPLEMENTING IMAGE AUTHENTICATION FOR AUTHENTICATING PERSONS OR ITEMS

CROSS-REFERENCES TO RELATED APPLICATIONS

This application claims priority to U.S. Patent Application Ser. No. 62/524,672 (the "'672 Application"), filed Jun. 26, 2017 by Keyurkumar K. Patel et al., entitled, "Method to Measure Image Authenticity from a Single Image," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing authentication functionality, and, more particularly, to methods, systems, and apparatuses for implementing image authentication for authenticating persons or items.

BACKGROUND

As the world continues to be interconnected via networked devices, the need to automatically, via a software method, verify the validity of a remote person or item is increasingly required. In order to remotely determine the validity of an item or person, it must first be determined if the person or item is authentic. In many (but not all) cases the system used to verify the authenticity of a person or item is an application, such as (but not limited to) a mobile app, where the user is asked to capture a rendering of the person or item via an optical sensor.

A limitation to determining the validity of a person or item via an optical sensor is that the sensor could be capturing a previously captured image or video of the same person or item displayed on a physical medium, digital medium, or other medium. In such cases, a robust method is needed to automatically determine if the person or item being captured via the optical sensor is physically present (authentic) or was previously captured (inauthentic).

A common technique to determine authenticity is to require the person or item of interest to perform certain actions. In this case, an image sequence is captured (in the form of a video) and analyzed to determine if the actions are correctly performed. However, there are six key limitations with this approach. First, it is time-consuming, inconvenient, and tedious to for the person or item to perform such actions. Second, there is significant data bandwidth required to transmit the image sequence. Third, it is computationally burdensome to automatically analyze the image sequence. Fourth, while image sequences of actions may be sufficient for determining the authenticity of the person or item (i.e., that person or item is physically present), it may not be sufficient to use with methods for determining the validity of the person or item. Fifth, while persons can perform actions, many items cannot perform actions. Sixth, providing an inauthentic recording of the same actions being performed can defeat this approach (video replay attack).

Similarly, some methods analyze differences between a person's presentation across multiple consecutive image frames. While these multi-frame, micro-movement analysis methods impose less inconvenience on an end user, they still suffer from the aforementioned issues of transmission bandwidth, computational complexity, and video replay attack. They also remain unusable with inanimate objects.

Another technique is to analyze the authenticity of a single image captured from the optical device. This technique requires a lower level of cooperation from the user, requires only the transmission of a single image, is often compatible with validity methods, such as face recognition, and can be performed with more items than action-based methods. These methods will either perform pre-processing of the image or assume the structure of an authentic image must adhere to hand crafted patterns.

Single image techniques that rely on pre-processing of the image, such as, but not limited to, cropping, resizing, aligning or recompressing, have the drawback that they may inadvertently discard the most informative image artifacts for determining authenticity.

Single image techniques that rely on hand crafted features, such as, but not limited to, local binary patterns, have the drawback that the features may not capture the most salient information for determining authenticity.

Other methods rely on specialized sensors, such as 3D or Infrared cameras, to measure authenticity. These methods have several limitations. First, specialized sensors are often expensive and are not ubiquitous, meaning it is difficult to assume a user would have access to such a sensor. Next, methods that rely on specialized sensors face the same difficulty in measuring validity as methods that rely on 2D optical sensors, in that both methods must develop specialized algorithms for measuring validity for data collected on such sensor. Moreover, of all existing data that is readily available for developing such specialized algorithms, the overwhelming majority has been collected on 2D optical sensors rather than for specialized sensors. Finally, the amount of computational time and/or resources needed to analyze the output from specialized sensors is often greater than for optical images.

Hence, there is a need for more robust and scalable solutions for implementing authentication functionality, and, more particularly, for methods, systems, and apparatuses for implementing image authentication for authenticating persons or items. In particular, a need exists for a method and system that can determine authenticity based on a single image. Further, the method and system should be able to leverage all available image information, and thus should not depend on the performance of any pre-processing, and the method and system should use analysis techniques that are based on the most salient pieces of information to analyze.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4E are flow diagrams illustrating various methods for implementing image authentication for authenticating persons or items, in accordance with various embodiments.

DETAILED DESCRIPTION OF CERTAIN EMBODIMENTS

Overview

Figure 1:
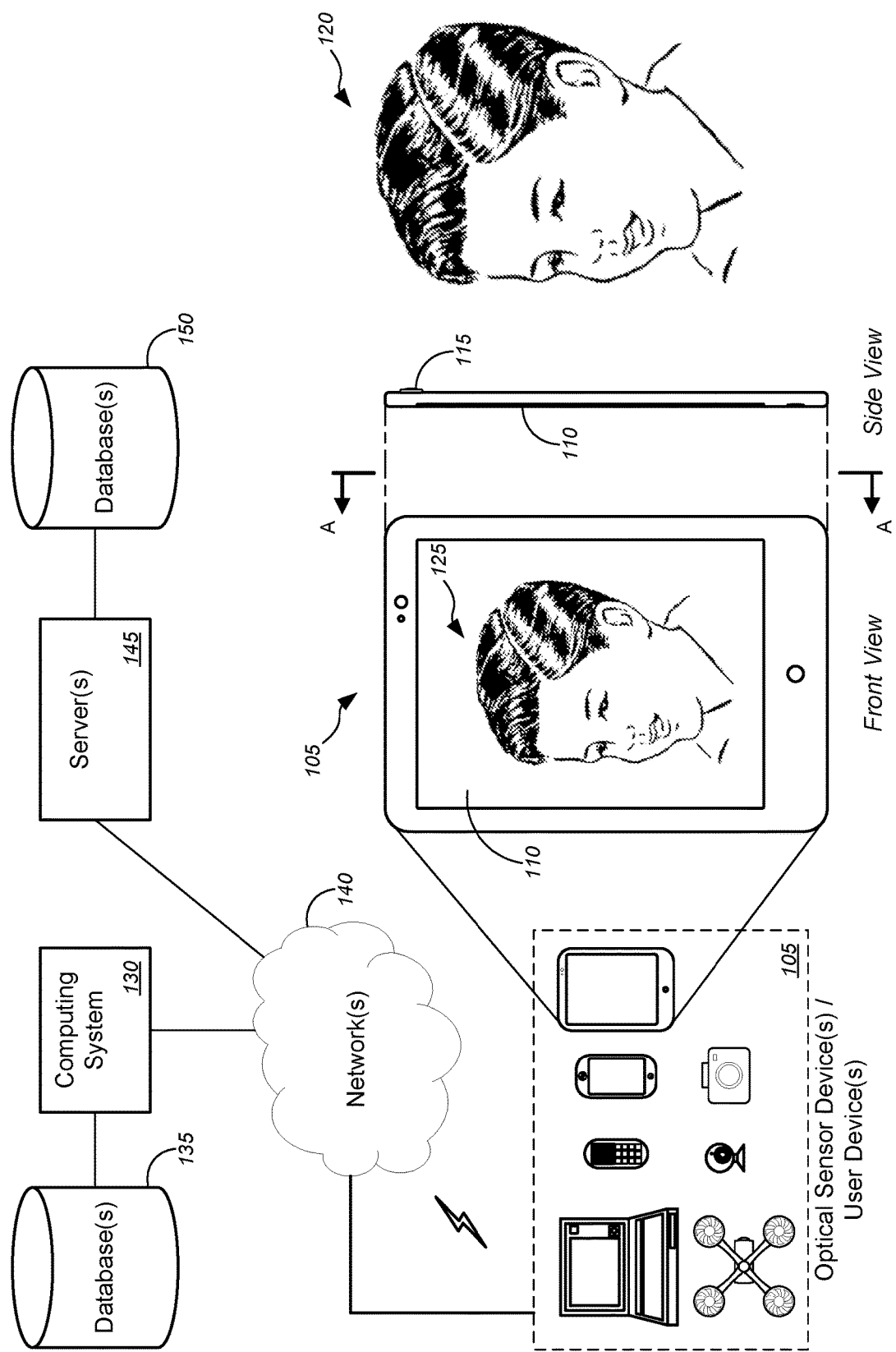
FIG. 1 is a schematic diagram illustrating a system for implementing image authentication for authenticating persons or items, in accordance with various embodiments.

Various embodiments provide tools and techniques for implementing authentication functionality, and, more particularly, methods, systems, and apparatuses for implementing image authentication for authenticating persons or items.

The various embodiments function to determine the authenticity of an image, captured from an optical sensor, based on analysis of raw image artifacts. The authenticity of an image is defined as whether the image was previously captured (herein referred to as being "inauthentic") or was captured at the moment of analysis (herein referred to as being "authentic"). Determining the authenticity of an image is generally the precursor to determining the validity of an image, where validity is defined as whether the person or item captured in the image is who or what it is claimed to be (herein referred to as being "valid") or whether it is different person or item (herein referred to as being "invalid"). Thus, the various embodiments facilitate the implementation of security measures that effectively authenticate a person or item being scanned via capture of an optical image. In the case of scanning a person, authentication of such a person using the techniques described herein serves, in some embodiments, as a gateway to access to information, physical resources or assets, financial assets, or locations, and/or the like by an authenticated person. In the case of scanning an item, authentication of such an item serves, in some embodiments, as a way to validate that item (e.g., an original or authentic item might have an intrinsic value that is greater than that of a forgery or a fake item, or the like).

In some embodiments, optical sensor devices or user devices might each capture an image or a video stream of a person or an item and might send the captured image or video stream to a computing system. According to some embodiments, the computing system may be co-located with one or more sensors (e.g., a smart phone, or the like). The computing system might receive the image or video stream from the optical sensor devices or user devices and might extract one or more image regions from each received image. The computing system might analyze each of the one or more image regions to identify one or more spatial relationships amongst pixels and/or groups of pixels in each image region, might compare each identified spatial relationship amongst pixels and/or groups of pixels in each image region with a plurality of spatial relationships amongst pixels and/or groups of pixels that are characteristic of particular image artifacts (which may be known or identified through machine learning, artificial intelligence, or similar heuristics, and the like), and might generate at least one of one or more authenticity values (e.g., global authenticity values, etc.) or one or more results for the image based at least in part on results of the analysis and the comparison. The at least one of the one or more authenticity values or the one or more results for the image, according to some embodiments, might be indicative of a likelihood of authenticity of the image. In some cases, the at least one of the one or more authenticity values or the one or more results for the image might be further based at least in part on one or more aggregation techniques of weighted likelihood values across all analyzed image regions. Alternatively, the at least one of the one or more authenticity values or the one or more results for the image might be further based at least in part on one or more aggregation techniques of weighted likelihood values across a subset of analyzed image regions. In some cases, the computing system might store the received image in a data storage device, by storing the raw image data as captured by the one or more optical sensor devices or user devices, without aligning, cropping, filtering, resizing, compressing, or performing other image processing on the raw image data, and/or the like.

In some embodiments, the computing system might obtain one or more authentic images and one or more inauthentic images (ideally, a plurality of authentic images and a plurality of inauthentic images), where the one or more authentic images each comprises image data of one or more of an actual person or an actual item as captured directly by the optical sensor device, and where the one or more inauthentic images each comprises image data of previously captured images of one or more of a person or an item. The computing system might extract one or more image regions from each of the one or more authentic images and from each of the one or more inauthentic images and might identify one or more spatial relationships of pixels and/or groups of pixels that distinguish between authentic images and inauthentic images, using machine learning techniques or the like. The identified one or more spatial relationships of pixels and/or groups of pixels that distinguish between authentic images and inauthentic images may then be stored in a data storage device, which may be accessed at a later time during authentication of images of persons or items.

The various embodiments enable authentication of a person or an item using only a single image (as opposed to some conventional techniques that require multiple images or require a person to perform actions, or the like), and can distinguish between a person or item that is actually present and previously captured images of such a person or item. These and related functionalities are described in detail below with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, image recognition technology, user authentication technology, item authentication technology, security technology, and/or the like. In other aspects, certain embodiments, can improve the functioning of user equipment or systems themselves (e.g., security equipment, image recognition systems, user authentication systems, item authentication systems, etc.), for example, by receiving, with a computing system, an image (in some cases, a single image) from an optical sensor device; extracting, with the computing system, one or more image regions from the received image; analyzing, with the computing system, each of the one or more image regions to identify one or more spatial relationships amongst pixels and/or groups of pixels in each image region; comparing, with the computing system, each identified spatial relationship amongst pixels and/or groups of pixels in each image region with a plurality of spatial relationships amongst pixels and/or groups of pixels that are characteristic of particular image artifacts (which may be known or identified through machine learning, artificial intelligence, or similar heuristics, and the like); and generating, with the computing system, at least one of one or more authenticity values or one or more results for the image based at least in part on results of the analysis and the comparison; and/or the like. In particular, to the extent any abstract concepts are present in the various embodiments, those concepts can be implemented as described herein by devices, software, systems, and methods that involve specific novel functionality (e.g., steps or operations), such as, determining the authenticity of an image, captured from an optical sensor, based on analysis of raw image artifacts, determining whether the image as obtained is an image of an actual person or item or is an image of a previously captured image of a person or item, and authenticating persons or items based solely on analysis of the image (without requiring the person perform any actions), and/or the like, to name a few examples, that extend beyond mere conventional computer processing operations. These functionalities can produce tangible results outside of the implementing computer system, including, merely by way of example, an optimized way to authenticate persons or items based solely on analysis of a captured single image, and/or the like, at least some steps of which optimized way may be observed or measured by third parties, such as customers and/or service providers.

In an aspect, a method might comprise receiving, with a computing system, an image from an optical sensor device; identifying, with the computing system, one or more image regions from the received image; analyzing, with the computing system, each of the one or more image regions to identify one or more spatial relationships amongst at least one of pixels or groups of pixels in each image region; comparing, with the computing system, each identified spatial relationship amongst the at least one of pixels or groups of pixels in each image region with a plurality of spatial relationships amongst the at least one of pixels or groups of pixels that are characteristic of particular image artifacts; and generating, with the computing system, at least one of one or more authenticity values or one or more results for the image based at least in part on results of the analysis and the comparison.

In some embodiments, the optical sensor device might comprise at least one of an image capture device, a video capture device, a digital camera, a cell phone camera, a laptop computer camera, a tablet computer camera, a webcam, a security camera, a closed-circuit camera, a doorbell camera, an intercom camera, a drone-mounted camera, or a vehicle-mounted camera, and/or the like. In some cases, the image received from the optical sensor device might comprise an image extracted from a video stream that is received from the optical sensor device.

According to some embodiments, the method might further comprise storing the received image in a data storage device, wherein storing the received image comprises storing, in the data storage device, raw image data as captured by the optical sensor device, without aligning, cropping, filtering, resizing, compressing, or performing other image processing on the raw image data.

Merely by way of example, in some instances, identifying the one or more image regions from the received image might comprise extracting, with the computing system, one or more image regions from the received image. In some cases, identifying the one or more image regions comprises selecting, with the computing system, one of an arbitrary or a fixed number of image regions, wherein selecting the one of the arbitrary or the fixed number of image regions comprises one of using one or more machine learning techniques, using random selection techniques, or using image heuristics.

In some embodiments, identifying the one or more spatial relationships amongst the at least one of pixels or groups of pixels in each image region might comprise: obtaining, with the computing system, one or more authentic images and one or more inauthentic images, wherein the one or more authentic images each comprises image data of one of an actual person or an actual item as captured directly by the optical sensor device, and wherein the one or more inauthentic images each comprises image data of previously captured images of one of a person or an item; extracting, with the computing system, one or more image regions from each of the one or more authentic images and from each of the one or more inauthentic images; identifying, with the computing system, one or more spatial relationships of the at least one of pixels or groups of pixels that distinguish between authentic images and inauthentic images, using machine learning techniques; and storing, with the computing system, the identified one or more spatial relationships of the at least one of pixels or groups of pixels in a data storage device.

In some cases, the obtained one or more authentic images and the obtained one or more inauthentic images might be captured by different types or models of optical sensor devices. In some instances, analyzing each of the one or more image regions might comprise applying, with the computing system, a layer of convolutional kernels against each image region, wherein each convolutional kernel or combination of kernels corresponds to at least one of micro textures or other patterns that are indicative of differences between authentic images and inauthentic images. Merely by way of example, the micro textures might comprise at least one of natural texture of skin on a human face from an image that is as captured directly by the optical sensor device, natural texture of a material of an item from an image that is as captured directly by the optical sensor device, a moiré pattern from image capture of an image of a person, a moiré pattern from image capture of an image of an item, an image artifact from a printed photograph of a person, an image artifact from a printed photograph of an item, a compression artifact from display of a photograph of a person, a compression artifact from display of a photograph of an item, a compression artifact from a screen display of an image of a person, a compression artifact from a screen display of an image of an item, or an image artifact resulting from image capture by one of particular types of optical sensor devices, and/or the like.

In some instances, analyzing each of the one or more image regions further might comprise processing, with the computing system and using a max pooling filter, a response from each convolutional kernel or combination of kernels to determine whether a given convolutional filter has detected a signal corresponding to a micro texture of one or more convolutional kernels. In some cases, analyzing each of the one or more image regions might further comprise passing outputs of the max pooling filter into an inner product layer, and identifying, with the inner product layer, a linear combination of the response from each convolutional kernel or combination of kernels and generating, with the inner product layer, a linearly optimal score value corresponding to a likelihood that the image constitutes an authentic image.

According to some embodiments, the method might further comprise assigning, with the computing system, a weighted likelihood value to each of the one or more image regions based on strength of the identified one or more spatial relationships amongst the at least one of pixels or groups of pixels in each image regions. In such cases, generating the at least one of the one or more authenticity values or the one or more results might be further based at least in part on the assigned weighted likelihood value.

In some embodiments, the at least one of the one or more authenticity values or the one or more results for the image might be indicative of a likelihood of authenticity of the image. In some cases, the at least one of the one or more authenticity values or the one or more results for the image might be further based at least in part on one or more aggregation techniques of weighted likelihood values across all analyzed image regions. Alternatively, the at least one of the one or more authenticity values or the one or more results for the image might be further based at least in part on one or more aggregation techniques of weighted likelihood values across a subset of analyzed image regions.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive an image from an optical sensor device; extract one or more image regions from the received image; analyze each of the one or more image regions to identify one or more spatial relationships amongst the at least one of pixels or groups of pixels in each image region; compare each identified spatial relationship amongst the at least one of pixels or groups of pixels in each image region with a plurality of spatial relationships amongst the at least one of pixels or groups of pixels that are characteristic of particular image artifacts; and generate at least one of one or more authenticity values or one or more results for the image based at least in part on results of the analysis and the comparison.

According to some embodiments, the optical sensor device might comprise at least one of an image capture device, a video capture device, a digital camera, a cell phone camera, a laptop computer camera, a tablet computer camera, a webcam, a security camera, a closed-circuit camera, a doorbell camera, an intercom camera, a drone-mounted camera, or a vehicle-mounted camera, and/or the like.

In yet another aspect, a system might comprise a computing system and a display device. The computing system might comprise at least one first processor; and a first non-transitory computer readable medium communicatively coupled to the at least one first processor. The first non-transitory computer readable medium might have stored thereon computer software comprising a first set of instructions that, when executed by the at least one first processor, causes the computing system to: receive an image from an optical sensor device; extract one or more image regions from the received image; analyze each of the one or more image regions to identify one or more spatial relationships amongst the at least one of pixels or groups of pixels in each image region; compare each identified spatial relationship amongst the at least one of pixels or groups of pixels in each image region with a plurality of spatial relationships amongst the at least one of pixels or groups of pixels that are characteristic of particular image artifacts; generate at least one of one or more authenticity values or one or more results for the image based at least in part on results of the analysis and the comparison; and sending the generated at least one of the one or more authenticity values or the one or more results to the display device.

The display device might comprise a display screen; at least one second processor; and a second non-transitory computer readable medium communicatively coupled to the at least one second processor. The second non-transitory computer readable medium might have stored thereon computer software comprising a second set of instructions that, when executed by the at least one second processor, causes the display device to: receive the generated at least one of the one or more authenticity values or the one or more results; and display the generated at least one of the one or more authenticity values or the one or more results on the display screen.

In some embodiments, the computing system might comprise one of a tablet computer, a smart phone, a mobile phone, a laptop computer, a desktop computer, a gaming console, a media player, a server computer over a network, or a cloud-based computing system over a network, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing authentication functionality, and, more particularly, to methods, systems, and apparatuses for implementing image authentication for authenticating persons or items, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing image authentication for authenticating persons or items, in accordance with various embodiments.

In the non-limiting embodiment of FIG. 1, system 100 might comprise one or more optical sensor devices or user devices 105, which might include, without limitation, at least one of an image capture device, a video capture device, a digital camera, a cell phone camera, a laptop computer camera, a tablet computer camera, a webcam, a security camera (not shown), a closed-circuit camera (not shown), a doorbell camera (not shown), an intercom camera (not shown), a drone-mounted camera, or a vehicle-mounted camera (not shown), and/or the like. As shown in the non-limiting example of FIG. 1, an optical sensor device or user device 105 (depicted in FIG. 1 as a tablet computer, although not limited to such) might comprise a display screen 110 (which in some cases might be a touchscreen display, but can be a non-touchscreen display) and a camera or image/video capturing device (or optical sensor device) 115 (as shown in the side view that is taken along the A-A direction of the front view of the device 105). The optical sensor device or user device 105 might capture an image or video stream of a user 120 or item (not shown) using the camera 115, and, in some cases, might display a raw image 125 on the display screen 110. The optical sensor device or user device 105 might send the raw image or video stream to computing system 130 (which might have a corresponding database(s) 135) via network(s) 140 (using wired and/or wireless communications). In some embodiments, system 100 might further comprise one or more servers 145 and corresponding database(s) 150. The one or more servers 145 (and corresponding database(s) 150) might be used to accumulate or aggregate data regarding distinctions between authentic and inauthentic images, and/or the image artifacts associated with authentic and inauthentic images, or the like.

In some embodiments, the computing system 130 might include, but is not limited to, one of a tablet computer, a smart phone, a mobile phone, a laptop computer, a desktop computer, a gaming console, a media player, a server computer (e.g., server(s) 145 and corresponding database(s) 150) over a network (e.g., network 140 or the like), or a cloud-based computing system over a network (e.g., network 140 or the like), and in some instances might be the same device as the optical sensor device or user device 105. In some cases, the network 140 might include, but is not limited to, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

In operation, the one or more optical sensor devices or user devices 105 might each capture an image or a video stream of a person or an item, and might send the captured image or video stream to the computing system 130. The computing system 130 might receive the image or video stream from each of the one or more optical sensor devices or user devices 105, might extract one or more image regions from each received image (or each image frame from each image stream), might analyze each of the one or more image regions to identify one or more spatial relationships amongst pixels and/or groups of pixels in each image region, might compare each identified spatial relationship amongst pixels and/or groups of pixels in each image region with a plurality of spatial relationships amongst pixels and/or groups of pixels that are characteristic of particular image artifacts (which may be known or identified through machine learning, artificial intelligence, or similar heuristics, and the like), and might generate at least one of one or more authenticity values (e.g., global authenticity values or the like) or one or more results for the image based at least in part on results of the analysis and the comparison. Herein, "spatial relationships" might refer to any comparison or relationships among pixels and/or groups of pixels (including, but not limited to, comparison or relationship of pixel A to pixel B given an intensity value of pixel C; geometric relationships amongst pixels and/or groups of pixels; comparison or relationship of distance ratios amongst pixels and/or groups of pixels; multi-order relationships of pixel intensity values, ratios, gradients, kernel similarities; and/or the like), or might refer to any comparison or relationships among values of pixels and/or aggregate or average values of groups of pixels that may be arranged in a multi-dimensional array. In some cases, pixel intensity values might include, without limitation, grayscale values, RGB values, infrared values, UV values, X-Ray values, microwave values, gamma-ray values, CAT-scan values, and/or the like. The at least one of the one or more authenticity values or the one or more results for the image, according to some embodiments, might be indicative of a likelihood of authenticity of the image. In some cases, the at least one of the one or more authenticity values or the one or more results for the image might be further based at least in part on one or more aggregation techniques of weighted likelihood values across all analyzed image regions. Alternatively, the at least one of the one or more authenticity values or the one or more results for the image might be further based at least in part on one or more aggregation techniques of weighted likelihood values across a subset of analyzed image regions. In some cases, the computing system 130 might store the received image in a data storage device (e.g., database(s) 135 or the like), by storing the raw image data as captured by the one or more optical sensor devices or user devices 105, without aligning, cropping, filtering, resizing, compressing, or performing other image processing on the raw image data, and/or the like.

In some embodiments, extracting the one or more image regions from the received image might comprise identifying, with the computing system, one or more image regions to extract from the received image, which might include selecting, with the computing system, one of an arbitrary or a fixed number of image regions, in some cases, using one or more machine learning techniques, using random selection techniques, or using image heuristics, or a combination of these techniques.

According to some embodiments, the computing system 130 might assign a weighted likelihood value to each of the one or more image regions based on the strength of the identified one or more spatial relationships amongst pixels and/or groups of pixels in each image regions. In such cases, generating the at least one of the one or more authenticity values or the one or more results might be further based at least in part on the assigned weighted likelihood value.

In some instances, the computing system 130 might set the resolution of the image to fall within particular ranges depending on the portion of an image of a person being analyzed or the portion of an image of an item being analyzed. For example, when applied to a person's face, the resolution of the face is set to fall within fixed resolutions so as to limit the variation in the texture measured by the camera at the pixel-level. In practice, the resolution is between 50 and 180 pixels per inch ("PPI"), or the like. When applied to a person's face, in order to restrict the resolution to fall within a prescribed resolution, the face is detected and in turn facial landmarks are detected (e.g., the center of the eye sockets, the nose, the edges of the mouth, etc.), and this information is used to compute the general PPI resolution. Images that fall outside of this prescribed resolution are discarded. When applied to an item (as opposed to a person), the resolution is similarly restricted to fall within a fixed PPI that is informed by the material characteristics of the item, or the like.

To facilitate or to improve authentication of persons or items (i.e., to facilitate or improve identification of spatial relationships amongst pixels and/or groups of pixels in image regions to distinguish between authentic and inauthentic images), the system 100 might be trained using artificial intelligence ("AI") and/or other machine learning techniques, and/or the like. To do so, the computing system 130 (and/or server(s) 145) might obtain one or more authentic images and one or more inauthentic images (ideally, a plurality of authentic images and a plurality of inauthentic images; in some cases, hundreds of thousands of images, or more), where the one or more authentic images each comprises image data of one of an actual person or an actual item as captured directly by the optical sensor device, and where the one or more inauthentic images each comprises image data of previously captured images of one of a person or an item. The computing system 130 (and/or server(s) 145) might extract one or more image regions from each of the one or more authentic images and from each of the one or more inauthentic images, and might identify one or more spatial relationships of at least one of pixels or groups of pixels that distinguish between authentic images and inauthentic images, using machine learning techniques or the like. The identified one or more spatial relationships of the at least one of pixels or groups of pixels that distinguish between authentic images and inauthentic images may then be stored in a data storage device (e.g., database(s) 135 and/or database(s) 150), which may be accessed at a later time during authentication of images of persons or items. In some cases, the obtained one or more authentic images and the obtained one or more inauthentic images might be captured by different types or models of optical sensor devices. Different types or models of optical sensor devices might produce different image artifacts or the like, and learning to identify such image artifacts facilitates distinguishing between authentic and inauthentic images.

In some aspects, analyzing each of the one or more image regions might comprise applying, with the computing system, a layer of convolutional kernels against each image region, where each convolutional kernel or combination of kernels might correspond to micro textures and/or other patterns that are indicative of differences between authentic images and inauthentic images. Merely by way of example, the micro textures might include, without limitation, at least one of natural texture of skin on a human face from an image that is as captured directly by the optical sensor device, natural texture of a material of an item from an image that is as captured directly by the optical sensor device, a moiré pattern from image capture of an image of a person, a moiré pattern from image capture of an image of an item, an image artifact from a printed photograph of a person, an image artifact from a printed photograph of an item, a compression artifact from display of a photograph of a person, a compression artifact from display of a photograph of an item, a compression artifact from a screen display of an image of a person, a compression artifact from a screen display of an image of an item, or an image artifact resulting from image capture by one of particular types of optical sensor devices, and/or the like. In some instances, analyzing each of the one or more image regions might further comprise processing, with the computing system and using a max pooling filter, a response from each convolutional kernel or combination of kernels to determine whether a given convolutional filter has detected a signal corresponding to a micro texture of one or more convolutional kernels. In some cases, analyzing each of the one or more image regions might further comprise passing outputs of the max pooling filter into an inner product layer, and identifying, with the inner product layer, a linear combination of the response from each convolutional kernel or combination of kernels and generating, with the inner product layer, a linearly optimal score value corresponding to a likelihood that the image constitutes an authentic image.

Further with regard to learning functionalities, using the collections of images, spatial relationships between the at least one of pixels or groups of pixels within a local region of the image are measured in both sets of images (authentic and inauthentic). According to some non-limiting embodiments, while a given measurement of spatial relationships amongst the at least one of pixels or groups of pixels will occur within a local region (such as, but not limited to, within 64 pixels), these relationships might not be measured in any specific region within the image. The relationships may instead be measured at any arbitrary region within the image. In order to develop samples to train the algorithm, each sample/image collected (authentic and inauthentic) might be sub-sampled, where random rectangular image patches of size 64×64 pixels might be sampled within the image. In practice, according to some embodiments, one might sample between 50 and 200 patches of size 64×64 pixels, or the like. When training an algorithm to authenticate the presence of a person's face, the face might first be detected, and the sub-sampling might occur within the region of the image that corresponds to the persons face. Using this approach, a large number of micro-textures of authentic and inauthentic samples (such as described above) may be generated as being available for learning the differences between such cases. At no point during this process is the image ever resized, so as to maintain the original texture of the image. Although specific implementations are provided above, the various embodiments are not so limited, and other implementations may be used to train the algorithm and/or to implement image authentication for authenticating persons or items.

The measured spatial relationships amongst the at least one of pixels or groups of pixels used in conjunction with a statistical model, such as, but not limited to, a Deep Learning method, to learn the specific spatial relationships that have the most salient difference between authentic and inauthentic images. These relationships may indicate many different phenomena separating authentic from inauthentic images, including, but not limited to, compression artifacts in the inauthentic images or artifacts in the medium that is displaying the inauthentic image. The most salient spatial relationships discovered via statistical modeling are retained. The number of such relationships retained is dependent on the trade-off between speed and accuracy. For example, the number of relationships retained could be, but is not limited to, 16, 32, 64, or 128 different such relationships. In various implementations, a multi-layer convolutional neural network may be learned, where the first layer may consist of 16×16 convolutional kernels that may be applied against the 64×64 pixel image patches that were created (as described above). The number of convolutional kernels learned may be 16, 32, 64, or 128 kernels. Each convolutional kernel or combination of kernels may correspond to micro textures or other patterns that are indicative of the difference between an authentic sample and an inauthentic sample. These kernels may cover different textures encountered within the range of resolutions the samples have been captured, as defined by PPI considerations discussed above. Although specific implementations are provided above, the various embodiments are not so limited, and other implementations may be used to train the algorithm and/or to implement image authentication for authenticating persons or items.

The statistical model used to determine the most salient spatial relationships may also output a probability that a given spatial relationship measured in a given image is authentic and/or inauthentic. As multiple spatial relationships are measured in an image region, probabilities from each relationship are accumulated using, but not limited to, the average (arithmetic mean) likelihood values across all such relationships, the maximum likelihood value across all such relationships, or a linear or non-linear combination of likelihood values across all such relationships, or the like. The output of our model might be scored ranging from 0.0 to 1.0 (or any other scaled range), where a score of 1.0 might represent the highest likelihood of an inauthentic image and a score of 0.0 might represent the lowest likelihood of an inauthentic image, or vice versa. In primary applications of determining the authenticity of a face, the location of the patches might be sampled at specific facial landmarks, such as the tip of the nose or the corners of the mouth. In some implementations, one might use a number of such points on the face to sample 64×64 pixel patches that are then passed into the decision engine, which will output a score ranging from 0.0 to 1.0 for each patch.

The average probability of authenticity is computed in a single, arbitrary image region, as previously described. This method of measuring the average probability in an image region is then repeated an arbitrary number of times on other arbitrary regions. The number of times this process is repeated could be, but is not limited to, 4, 8, 16, 32, or 64 times. The optimal number of times to repeat this process is based on the tradeoff between speed and accuracy. The average probabilities computed across the multiple image regions are accumulated into a final likelihood. The accumulation into a final probability can be performed using, but not limited to, the arithmetic mean, or the like. In some implementations, the score for each of the different number of facial patches analyzed, the number of which could be, but is not limited to, 4, 8, 16, 32, or 64 such patches, are passed into the algorithm and are used to compute the arithmetic mean. The arithmetic mean of the all patches processed (e.g., 4, 8, 16, 32, or 64 patches in certain implementations) represents the final likelihood of authenticity. Guidance as to what threshold to use against the output numerical likelihood score, which does not have a direct probabilistic interpretation, is provided to users of the algorithm. Such threshold guidance will specify that (for example) a threshold of 0.65 will correspond to a false positive rate of 0.1 (i.e., one in ten inauthentic samples being incorrectly classified as authentic) and a threshold of 0.53 to a false positive rate of 0.01. Although specific values and numbers of samples (or the like) are described herein, the various embodiments are not so limited, and any suitable set(s) of values and numbers of samples (or the like) may be used consistent with the embodiments described herein.

These and other functions of the system 100 (and its components) are described in greater detail below with respect to FIGS. 2-4.

Figure 2A:
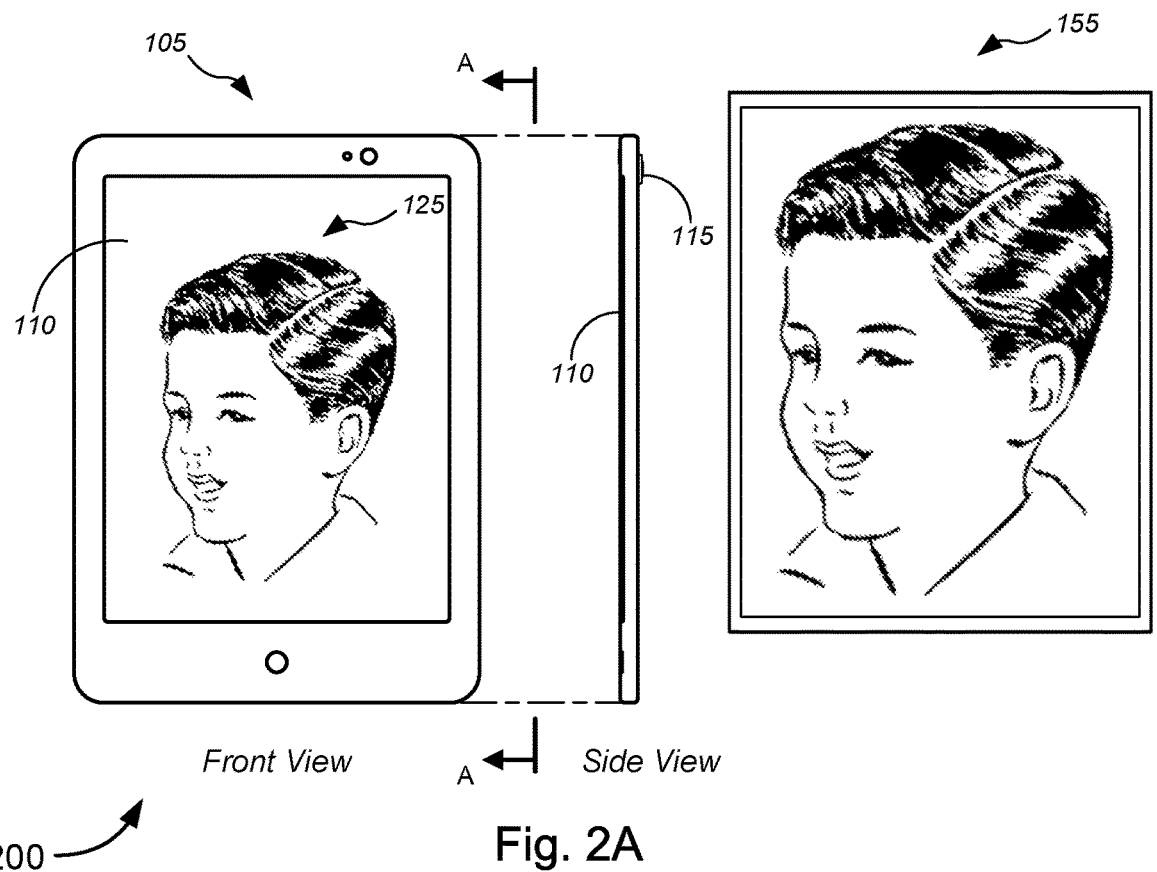
FIGS. 2A and 2B are schematic diagrams illustrating various embodiments for implementing image authentication for authenticating persons or items that distinguish actual persons or items from previously captured images of persons or items.
Figure 2B:
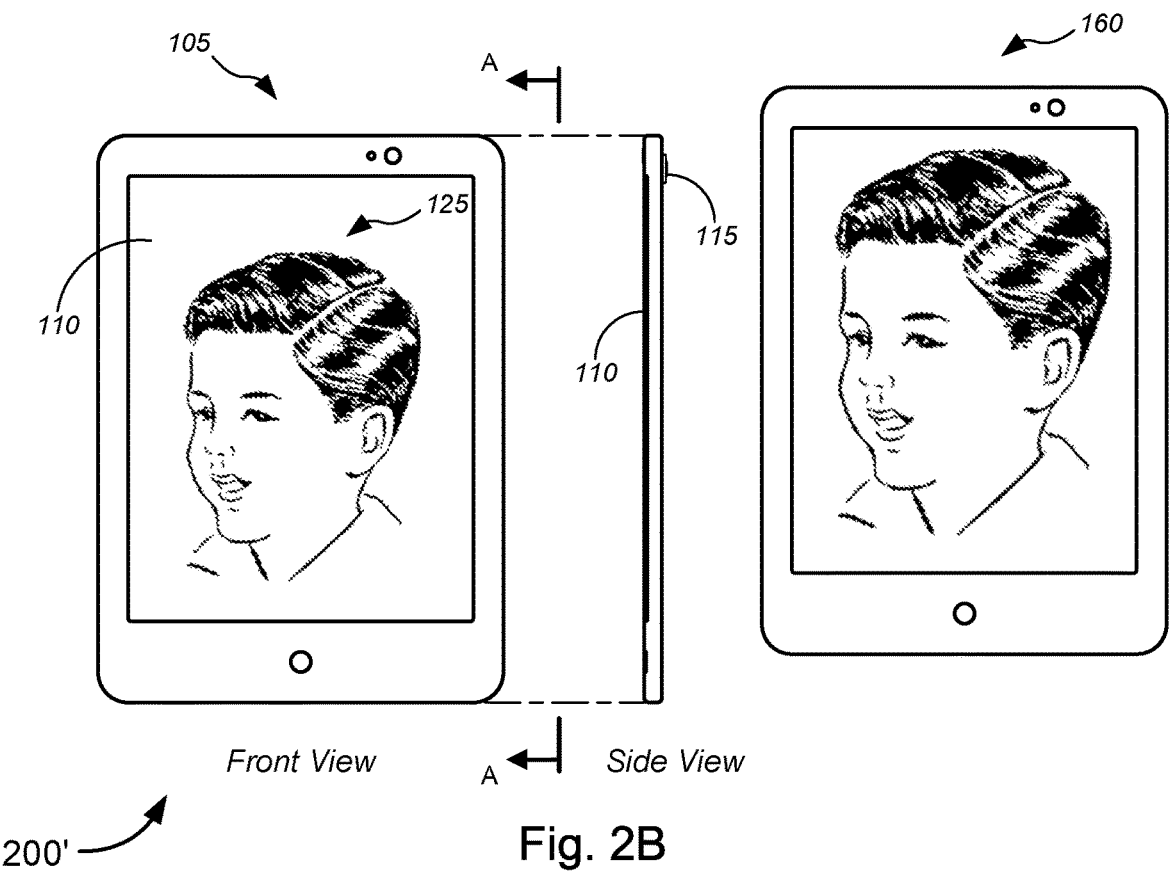

FIGS. 2A and 2B (collectively, "FIG. 2") are schematic diagrams illustrating various embodiments 200 and 200' for implementing image authentication for authenticating persons or items that distinguish actual persons or items from previously captured images of persons or items. While embodiment 200 of FIG. 2A depicts a case in which the optical sensor device or user device 105 captures an image or video stream of a previously captured image of a person (shown in FIG. 2A) or an item (not shown) in the form of a photograph 155, printed image, or the like, embodiment 200' of FIG. 2B depicts a case in which the optical sensor device or user device 105 captures an image or video stream of a previously captured image in the form of an image or video stream of a person (shown in FIG. 2B) or an item (not shown) that is displayed on a display screen of another user device 160 or the like. Either of these cases differs from the case in which the optical sensor device or user device 105 captures an image or video stream of an actual person 125 or an item (not shown), as depicted in FIG. 1. The system 100 is configured to analyze the captured image data (whether of an actual person or an item or of a previously captured image/video stream of a person or an item) to determine whether the image is authentic (i.e., of an actual person or an item) or inauthentic (i.e., of a previously captured image or video stream of a person or an item), as described in detail above with respect to FIG. 1, and below with respect to FIGS. 3 and 4.

Figure 3:
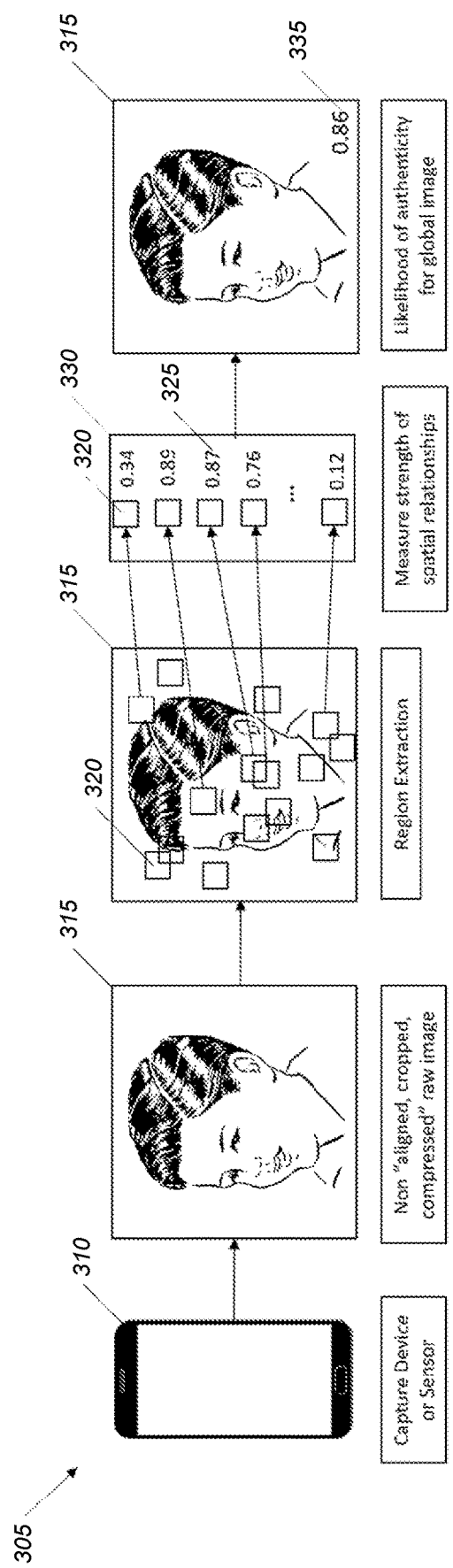
FIG. 3 is a schematic diagram illustrating an embodiment for implementing image authentication for authenticating persons or items.

FIG. 3 is a schematic diagram illustrating an embodiment 300 for implementing image authentication for authenticating persons or items. In the non-limiting embodiment of FIG. 3, a capture device or sensor 305 might capture, using an optical sensor device 310, an image of a person or an item, and might send non-aligned, non-cropped, non-filtered, non-resized, non-compressed, and non-image processed raw image 315 to a computing system, which might extract one or more image regions 320 from the image 315. The computing system might analyze each of the one or more image regions 320 to identify one or more spatial relationships amongst pixels and/or groups of pixels in each image region and/or to assign a weighted likelihood value to each of the one or more image regions based on strength of the identified one or more spatial relationships amongst pixels and/or groups of pixels in each image region 320. The computing system might generate authenticity values 325 across the multiple image regions 320 as collected at 330. The computing system might generate at least one of one or more authenticity values (e.g., global authenticity values, or the like) or one or more results 335 (in some cases, an average probability of authenticity, arithmetic mean of the values, and/or the like) based at least in part on the authenticity values 325 across the multiple image regions 320. The at least one of the one or more authenticity values or the one or more results 335 (which in the example of FIG. 3 might be 0.86 based on the authenticity values 325 across the multiple image regions 320, which might have values of 0.34, 0.89, 0.87, 0.76, 0.12, or the like, as shown in the non-limiting example of FIG. 3) represent a likelihood of authenticity of the global image.

FIGS. 4A-4E (collectively, "FIG. 4") are flow diagrams illustrating various methods 400, 400', and 400" for implementing image authentication for authenticating persons or items, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems or embodiments 100, 200, 200', and 300 of FIGS. 1, 2A, 2B, and 3, respectively (or components thereof), such methods may also be implemented using any suitable hardware (or software) implementation. Similarly, while each of the systems or embodiments 100, 200, 200', and 300 of FIGS. 1, 2A, 2B, and 3, respectively (or components thereof), can operate according to the method 400 illustrated by FIG. 4 (e.g., by executing instructions embodied on a computer readable medium), the systems or embodiments 100, 200, 200', and 300 of FIGS. 1, 2A, 2B, and 3 can each also operate according to other modes of operation and/or perform other suitable procedures.

Figure 4A:
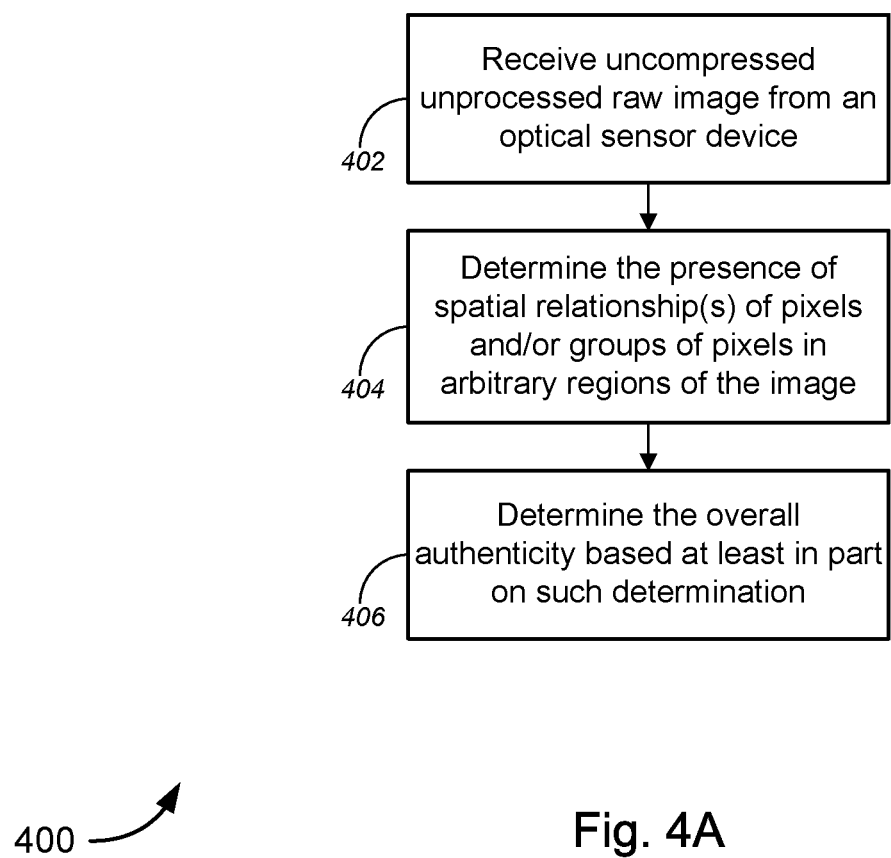

In the non-limiting embodiment of FIG. 4A, method 400, at block 402, might comprise receiving uncompressed unprocessed raw image from an optical sensor device. At block 404, method 400 might comprise determining the presence of spatial relationship(s) of pixels and/or groups of pixels in arbitrary regions of the image. Method 400 might further comprise determining the overall authenticity based at least in part on such determination (block 406).

Figure 4B:
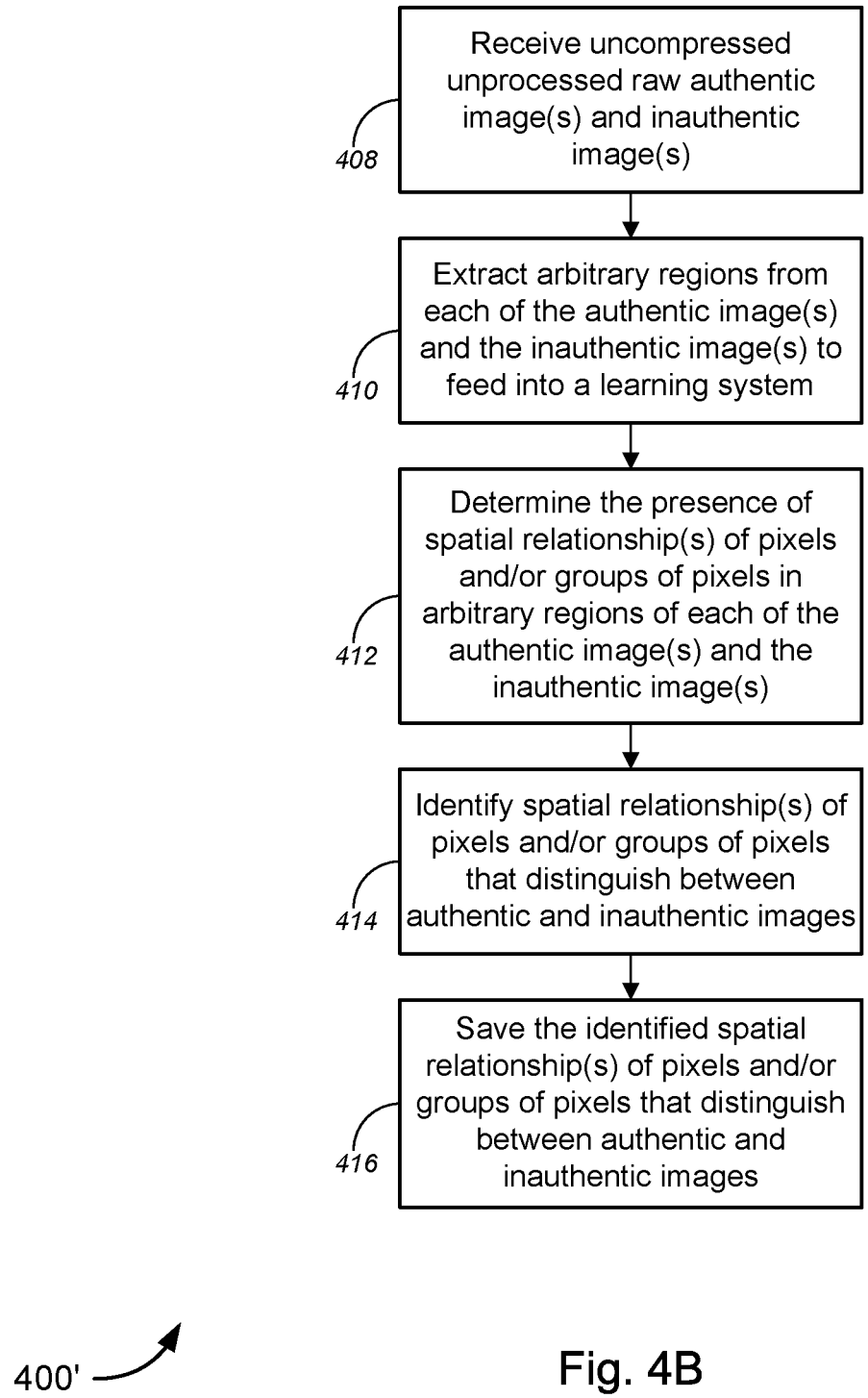

Alternatively, or additionally, in the non-limiting embodiment of FIG. 4B, method 400', at block 408, might comprise receiving uncompressed unprocessed raw authentic image(s) and inauthentic image(s). Here, the authentic images might each comprise image data of one of an actual person or an actual item as captured directly by the optical sensor device, while the inauthentic images might each comprise image data of previously captured images of one of a person or an item. Method 400' might further comprise extracting arbitrary regions from each of the authentic image(s) and the inauthentic image(s) to feed into a learning system (block 410), determining the presence of spatial relationship(s) of pixels and/or groups of pixels in arbitrary regions of each of the authentic image(s) and the inauthentic image(s) (block 412), and identifying spatial relationship(s) of pixels and/or groups of pixels that distinguish between authentic and inauthentic images (block 414). At block 416, method 400' might comprise saving the identified spatial relationship(s) of pixels and/or groups of pixels that distinguish between authentic and inauthentic images.

Figure 4C:
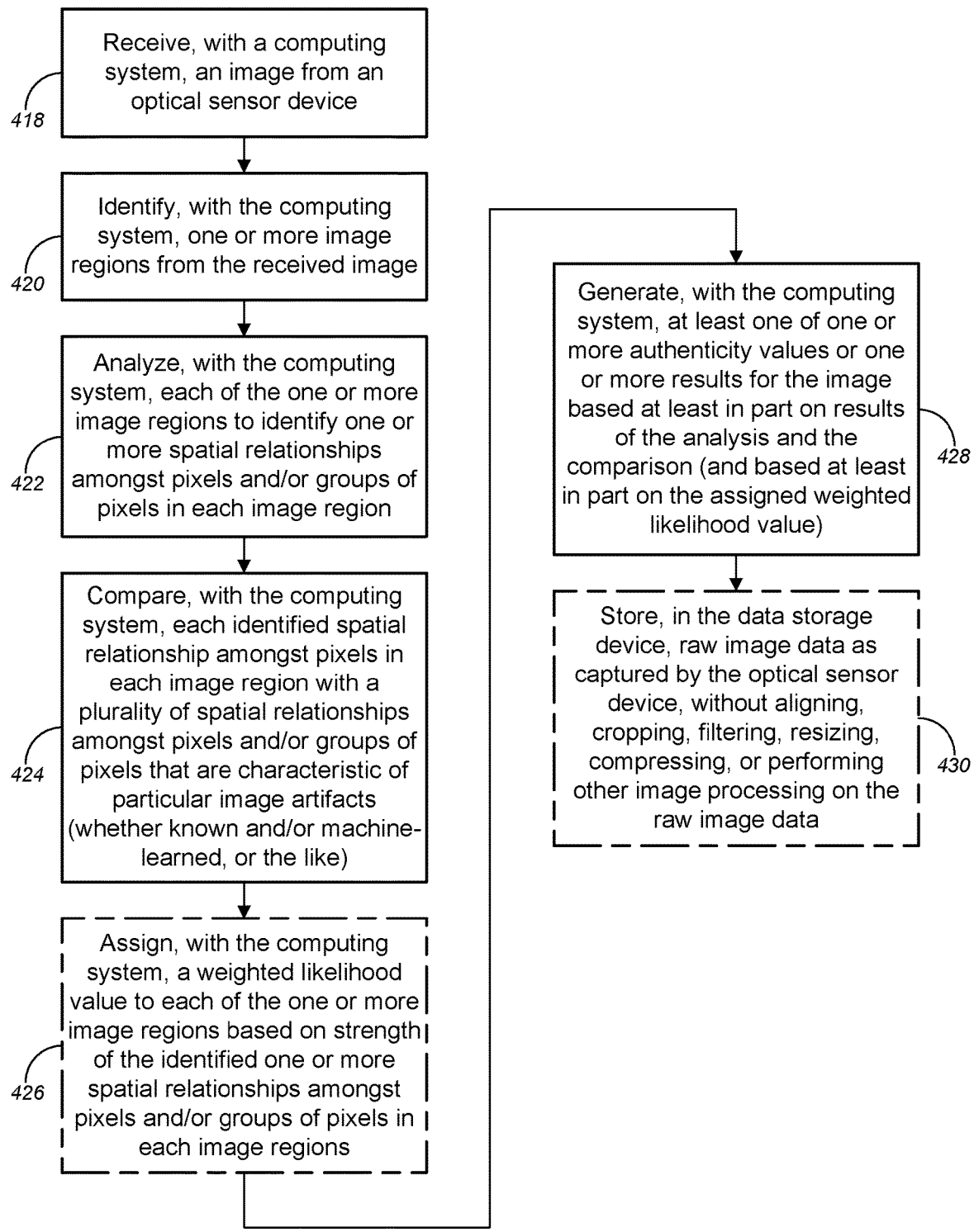

Alternatively, or additionally, in the non-limiting embodiment of FIG. 4C, method 400", at block 418, might comprise receiving, with a computing system, an image from an optical sensor device. According to some embodiments, the optical sensor device might include, without limitation, at least one of an image capture device, a video capture device, a digital camera, a cell phone camera, a laptop computer camera, a tablet computer camera, a webcam, a security camera, a closed-circuit camera, a doorbell camera, an intercom camera, a drone-mounted camera, or a vehicle-mounted camera, and/or the like. In some cases, the image received from the optical sensor device might comprise an image extracted from a video stream that is received from the optical sensor device. Method 400" might further comprise identifying, with the computing system, one or more image regions from the received image (block 420) and analyzing, with the computing system, each of the one or more image regions to identify one or more spatial relationships amongst pixels and/or groups of pixels in each image region (block 422). At block 424, comparing, with the computing system, each identified spatial relationship amongst pixels and/or groups of pixels in each image region with a plurality of spatial relationships amongst pixels and/or groups of pixels that are characteristic of particular image artifacts (which may be known or identified through machine learning, artificial intelligence, or similar heuristics, and the like). Method 400" might further comprise, at optional block 426, assigning, with the computing system, a weighted likelihood value to each of the one or more image regions based on strength of the identified one or more spatial relationships amongst pixels and/or groups of pixels in each image regions. At block 428, method 400" might comprise generating, with the computing system, at least one of one or more authenticity values (e.g., global authenticity values or the like) or one or more results for the image based at least in part on results of the analysis and the comparison. In the case that the weighted likelihood value has been assigned (as at optional block 424), generating the at least one of the one or more authenticity values or the one or more results might be further based at least in part on the assigned weighted likelihood value. In some embodiments, the at least one of the one or more authenticity values or the one or more results for the image might be indicative of a likelihood of authenticity of the image, and wherein the at least one of the one or more authenticity values or the one or more results for the image is further based at least in part on one or more aggregation techniques of weighted likelihood values across all analyzed image regions. Alternatively, the at least one of the one or more authenticity values or the one or more results for the image might be indicative of a likelihood of authenticity of the image, and wherein the at least one of the one or more authenticity values or the one or more results for the image is further based at least in part on one or more aggregation techniques of weighted likelihood values across a subset of analyzed image regions. Method 400" might further comprise storing the received image in a data storage device, by storing, in the data storage device, raw image data as captured by the optical sensor device, without aligning, cropping, filtering, resizing, compressing, or performing other image processing on the raw image data (optional block 430).

With reference to FIG. 4D, identifying the one or more image regions from the received image (at block 420) might comprise extracting, with the computing system, one or more image regions from the received image (block 432). Alternatively, identifying the one or more image regions (at block 420) might comprise selecting, with the computing system, one of an arbitrary or a fixed number of image regions, in some cases by using one of one or more machine learning techniques, random selection techniques, or image heuristics, and/or the like (block 434).

Referring to FIG. 4E, identifying the one or more spatial relationships amongst pixels and/or groups of pixels in each image region (at block 422) might comprise: obtaining, with the computing system, one or more authentic images and one or more inauthentic images, wherein the one or more authentic images each comprises image data of one of an actual person or an actual item as captured directly by the optical sensor device, and wherein one or more inauthentic images each comprises image data of previously captured images of one of a person or an item (block 436); extracting, with the computing system, one or more image regions from each of the one or more authentic images and from each of the one or more inauthentic images (block 438); identifying, with the computing system, one or more spatial relationships of pixels and/or groups of pixels that distinguish between authentic images and inauthentic images, using machine learning techniques (block 440); and storing, with the computing system, the identified one or more spatial relationships of pixels and/or groups of pixels in a data storage device (block 442).

In some embodiments, the obtained one or more authentic images and the obtained one or more inauthentic images might be captured by different types or models of optical sensor devices. In some instances, analyzing each of the one or more image regions might comprise applying, with the computing system, a layer of convolutional kernels against each image region, wherein each convolutional kernel or combination of kernels corresponds to micro textures that are indicative of differences between authentic images and inauthentic images. According to some embodiments, the micro textures might include, but are not limited to, at least one of natural texture of skin on a human face from an image that is as captured directly by the optical sensor device, natural texture of a material of an item from an image that is as captured directly by the optical sensor device, a moiré pattern from image capture of an image of a person, a moiré pattern from image capture of an image of an item, an image artifact from a printed photograph of a person, an image artifact from a printed photograph of an item, a compression artifact from display of a photograph of a person, a compression artifact from display of a photograph of an item, a compression artifact from a screen display of an image of a person, a compression artifact from a screen display of an image of an item, or an image artifact resulting from image capture by one of particular types of optical sensor devices, and/or the like. In some cases, analyzing each of the one or more image regions might further comprise processing, with the computing system and using a max pooling filter, a response from each convolutional kernel or combination of kernels to determine whether a given convolutional filter has detected a signal corresponding to a micro texture of one or more convolutional kernels. In some embodiments, analyzing each of the one or more image regions might further comprise passing outputs of the max pooling filter into an inner product layer, and identifying, with the inner product layer, a linear combination of the response from each convolutional kernel or combination of kernels and generating, with the inner product layer, a linearly optimal score value corresponding to a likelihood that the image constitutes an authentic image.

Exemplary System and Hardware Implementation

Figure 5:
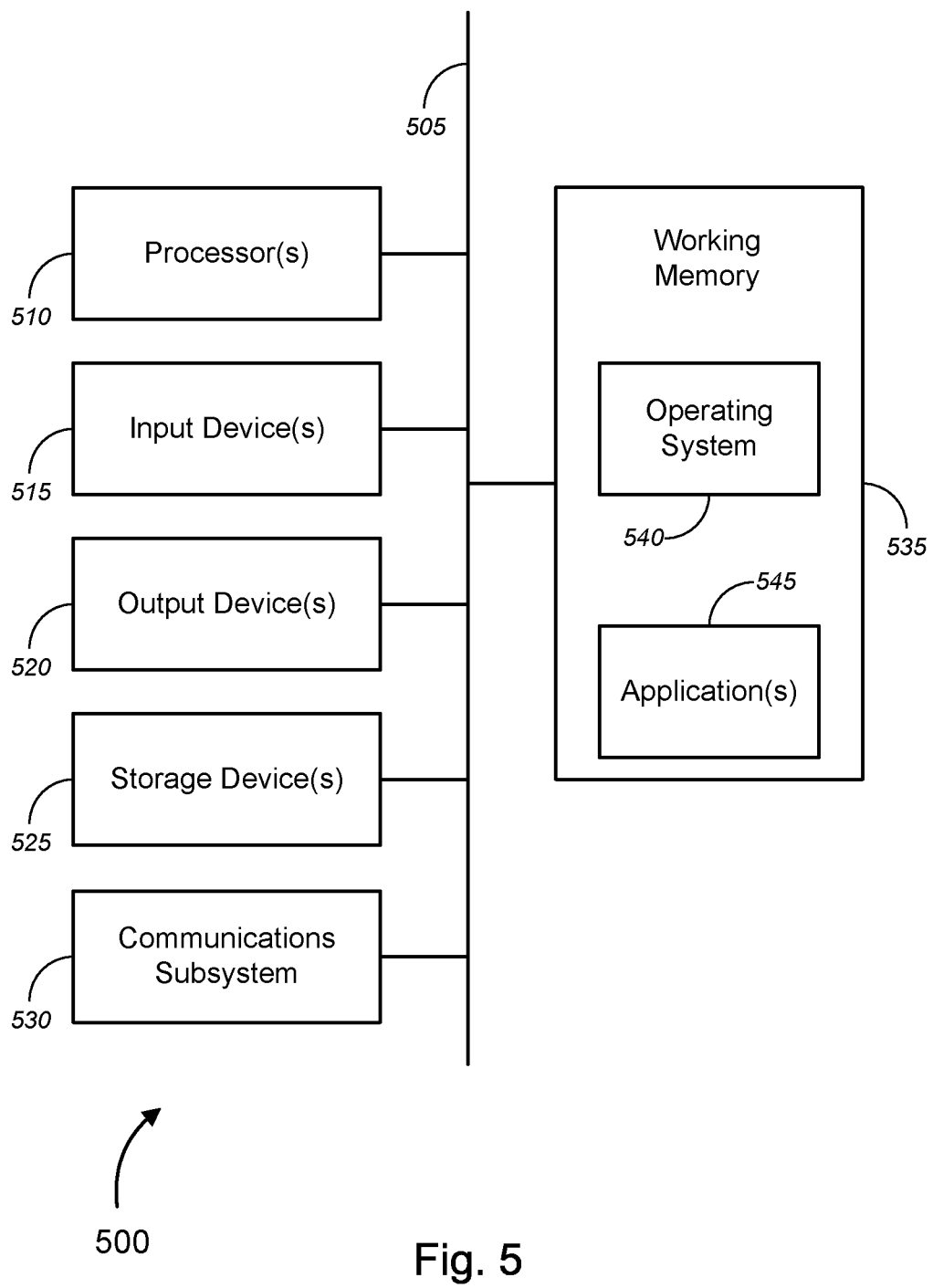
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., optical sensor devices or user devices 105 and 305, computing system 130, and server 145, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., optical sensor devices or user devices 105 and 305, computing system 130, and server 145, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
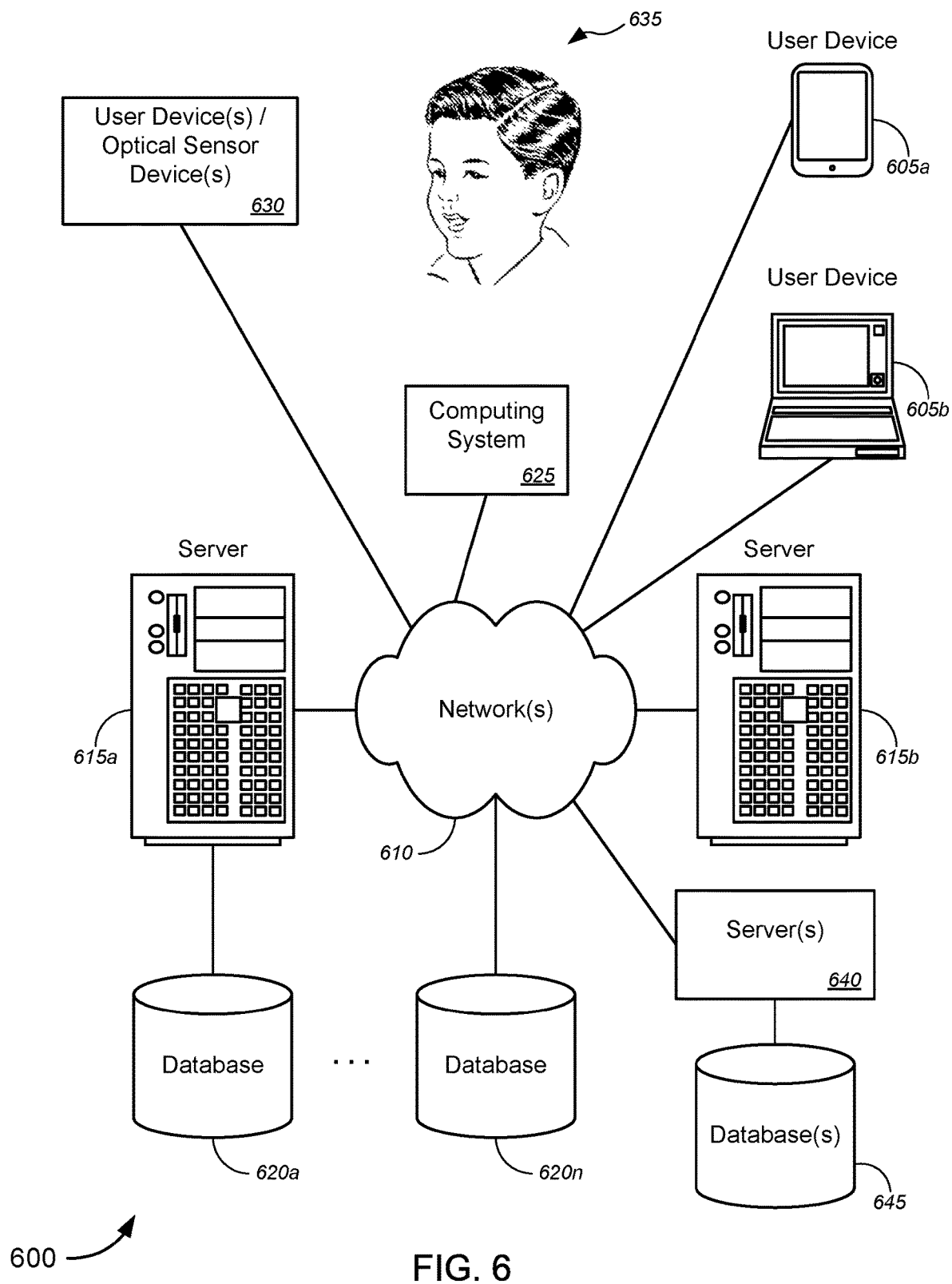
FIG. 6 is a block diagram illustrating a networked system of computers, computing systems, or system hardware architecture, which can be used in accordance with various embodiments.

As noted above, a set of embodiments comprises methods and systems for implementing authentication functionality, and, more particularly, to methods, systems, and apparatuses for implementing image authentication for authenticating persons or items. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 140 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing authentication functionality, and, more particularly, to methods, systems, and apparatuses for implementing image authentication for authenticating persons or items, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing system 130 of FIG. 1, or the like), one or more user devices or optical sensor devices 630 (similar to user devices or optical sensor devices 105 and 305 of FIGS. 1 and 3, or the like), one or more servers 640 and corresponding databases 645 (similar to server(s) 145 and corresponding database(s) 150 of FIG. 1, or the like).

In operation, the one or more optical sensor devices or user devices 630 might each capture an image or a video stream of a person or an item, and might send the captured image or video stream to the computing system 625. The computing system 625 might receive the image or video stream from each of the one or more optical sensor devices or user devices 630, might extract one or more image regions from each received image, might analyze each of the one or more image regions to identify one or more spatial relationships amongst pixels and/or groups of pixels in each image region, might compare each identified spatial relationship amongst pixels and/or groups of pixels in each image region with a plurality of spatial relationships amongst pixels and/or groups of pixels that are characteristic of particular image artifacts (which may be known or identified through machine learning, artificial intelligence, or similar heuristics, and the like), and might generate at least one of one or more authenticity values or one or more results for the image based at least in part on results of the analysis and the comparison. The at least one of the one or more authenticity values or the one or more results for the image, according to some embodiments, might be indicative of a likelihood of authenticity of the image. In some cases, the at least one of the one or more authenticity values or the one or more results for the image might be further based at least in part on one or more aggregation techniques of weighted likelihood values across all analyzed image regions. Alternatively, the at least one of the one or more authenticity values or the one or more results for the image might be further based at least in part on one or more aggregation techniques of weighted likelihood values across a subset of analyzed image regions. In some cases, the received image might be stored in a data storage device (e.g., database(s) 620 or the like), by storing the raw image data as captured by the one or more optical sensor devices or user devices 630, without aligning, cropping, filtering, resizing, compressing, or performing other image processing on the raw image data, and/or the like.

In some embodiments, the computing system 625 (and/or server(s) 640) might obtain one or more authentic images and one or more inauthentic images (ideally, a plurality of authentic images and a plurality of inauthentic images), where the one or more authentic images each comprises image data of one of an actual person or an actual item as captured directly by the optical sensor device, and where the one or more inauthentic images each comprises image data of previously captured images of one of a person or an item. The computing system 625 (and/or server(s) 640) might extract one or more image regions from each of the one or more authentic images and from each of the one or more inauthentic images, and might identify one or more spatial relationships of pixels and/or groups of pixels that distinguish between authentic images and inauthentic images, using machine learning techniques or the like. The identified one or more spatial relationships of pixels and/or groups of pixels that distinguish between authentic images and inauthentic images may then be stored in a data storage device (e.g., database(s) 620 and/or database(s) 645), which may be accessed at a later time during authentication of images of persons or items.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a computing system, an image from an optical sensor device;
identifying, with the computing system, one or more image regions from the received image;
analyzing, with the computing system, each of the one or more image regions to identify one or more spatial relationships amongst at least one of pixels or groups of pixels in each image region;
comparing, with the computing system, each identified spatial relationship amongst the at least one of pixels or groups of pixels in each image region with a plurality of spatial relationships amongst the at least one of pixels or groups of pixels that are characteristic of particular image artifacts; and generating, with the computing system, at least one of one or more authenticity values or one or more results for the image based at least in part on results of the analysis and the comparison.

2. The method of claim 1, wherein the optical sensor device comprises at least one of an image capture device, a video capture device, a digital camera, a cell phone camera, a laptop computer camera, a tablet computer camera, a webcam, a security camera, a closed-circuit camera, a doorbell camera, an intercom camera, a drone-mounted camera, or a vehicle-mounted camera.

3. The method of claim 1, wherein the image received from the optical sensor device comprises an image extracted from a video stream that is received from the optical sensor device.

4. The method of claim 1, further comprising:
storing the received image in a data storage device, wherein storing the received image comprises storing, in the data storage device, raw image data as captured by the optical sensor device, without aligning, cropping, filtering, resizing, compressing, or performing other image processing on the raw image data.

5. The method of claim 1, wherein identifying the one or more image regions from the received image comprises extracting, with the computing system, one or more image regions from the received image.

6. The method of claim 1, wherein identifying the one or more image regions comprises selecting, with the computing system, one of an arbitrary or a fixed number of image regions, wherein selecting the one of the arbitrary or the fixed number of image regions comprises one of using one or more machine learning techniques, using random selection techniques, or using image heuristics.

7. The method of claim 1, wherein identifying the one or more spatial relationships amongst the at least one of pixels or groups of pixels in each image region comprises:
obtaining, with the computing system, one or more authentic images and one or more inauthentic images, wherein the one or more authentic images each comprises image data of one of an actual person or an actual item as captured directly by the optical sensor device, and wherein the one or more inauthentic images each comprises image data of previously captured images of one of a person or an item;
extracting, with the computing system, one or more image regions from each of the one or more authentic images and from each of the one or more inauthentic images;
identifying, with the computing system, one or more spatial relationships of the at least one of pixels or groups of pixels that distinguish between authentic images and inauthentic images, using machine learning techniques; and
storing, with the computing system, the identified one or more spatial relationships of the at least one of pixels or groups of pixels in a data storage device.

8. The method of claim 7, wherein the obtained one or more authentic images and the obtained one or more inauthentic images are captured by different types or models of optical sensor devices.

9. The method of claim 7, wherein analyzing each of the one or more image regions comprises applying, with the computing system, a layer of convolutional kernels against each image region, wherein each convolutional kernel or combination of kernels corresponds to at least one of micro textures or other patterns that are indicative of differences between authentic images and inauthentic images.

10. The method of claim 9, wherein the micro textures comprise at least one of natural texture of skin on a human face from an image that is as captured directly by the optical sensor device, natural texture of a material of an item from an image that is as captured directly by the optical sensor device, a moiré pattern from image capture of an image of a person, a moiré pattern from image capture of an image of an item, an image artifact from a printed photograph of a person, an image artifact from a printed photograph of an item, a compression artifact from display of a photograph of a person, a compression artifact from display of a photograph of an item, a compression artifact from a screen display of an image of a person, a compression artifact from a screen display of an image of an item, or an image artifact resulting from image capture by one of particular types of optical sensor devices.

11. The method of claim 9, wherein analyzing each of the one or more image regions further comprises processing, with the computing system and using a max pooling filter, a response from each convolutional kernel or combination of kernels to determine whether a given convolutional filter has detected a signal corresponding to a micro texture of one or more convolutional kernels.

12. The method of claim 11, wherein analyzing each of the one or more image regions further comprises passing outputs of the max pooling filter into an inner product layer, and identifying, with the inner product layer, a linear combination of the response from each convolutional kernel or combination of kernels and generating, with the inner product layer, a linearly optimal score value corresponding to a likelihood that the image constitutes an authentic image.

13. The method of claim 1, further comprising:
assigning, with the computing system, a weighted likelihood value to each of the one or more image regions based on strength of the identified one or more spatial relationships amongst the at least one of pixels or groups of pixels in each image region;
wherein generating the at least one of the one or more authenticity values or the one or more results are further based at least in part on the assigned weighted likelihood value.

14. The method of claim 1, wherein the at least one of the one or more authenticity values or the one or more results for the image are indicative of a likelihood of authenticity of the image, and wherein the at least one of the one or more authenticity values or the one or more results for the image are further based at least in part on one or more aggregation techniques of weighted likelihood values across all analyzed image regions.

15. The method of claim 1, wherein the at least one of the one or more authenticity values or the one or more results for the image are indicative of a likelihood of authenticity of the image, and wherein the at least one of the one or more authenticity values or the one or more results for the image are further based at least in part on one or more aggregation techniques of weighted likelihood values across a subset of analyzed image regions.

16. An apparatus, comprising:
   at least one processor; and
   a non-transitory computer readable medium communicatively coupled to the at least one processor, the non-transitory computer readable medium having stored thereon computer software comprising a set of instructions that, when executed by the at least one processor, causes the apparatus to:
      receive an image from an optical sensor device;
      extract one or more image regions from the received image;
      analyze each of the one or more image regions to identify one or more spatial relationships amongst the at least one of pixels or groups of pixels in each image region;
      compare each identified spatial relationship amongst the at least one of pixels or groups of pixels in each image region with a plurality of spatial relationships amongst the at least one of pixels or groups of pixels that are characteristic of particular image artifacts; and
      generate at least one of one or more authenticity values or one or more results for the image based at least in part on results of the analysis and the comparison.

17. The apparatus of claim 16, wherein the optical sensor device comprises at least one of an image capture device, a video capture device, a digital camera, a cell phone camera, a laptop computer camera, a tablet computer camera, a webcam, a security camera, a closed-circuit camera, a doorbell camera, an intercom camera, a drone-mounted camera, or a vehicle-mounted camera.

18. A system, comprising:
   a computing system, comprising:
      at least one first processor; and
      a first non-transitory computer readable medium communicatively coupled to the at least one first processor, the first non-transitory computer readable medium having stored thereon computer software comprising a first set of instructions that, when executed by the at least one first processor, causes the computing system to:
         receive an image from an optical sensor device;
         extract one or more image regions from the received image;
         analyze each of the one or more image regions to identify one or more spatial relationships amongst the at least one of pixels or groups of pixels in each image region;
         compare each identified spatial relationship amongst the at least one of pixels or groups of pixels in each image region with a plurality of spatial relationships amongst the at least one of pixels or groups of pixels that are characteristic of particular image artifacts;
         generate at least one of one or more authenticity values or one or more results for the image based at least in part on results of the analysis and the comparison; and
         sending the generated at least one of the one or more authenticity values or the one or more results to a display device;
   the display device, comprising:
      a display screen;
      at least one second processor; and
      a second non-transitory computer readable medium communicatively coupled to the at least one second processor, the second non-transitory computer readable medium having stored thereon computer software comprising a second set of instructions that, when executed by the at least one second processor, causes the display device to:
         receive the generated at least one of the one or more authenticity values or the one or more results; and
         display the generated at least one of the one or more authenticity values or the one or more results on the display screen.

19. The system of claim 18, wherein the computing system comprises one of a tablet computer, a smart phone, a mobile phone, a laptop computer, a desktop computer, a gaming console, a media player, a server computer over a network, or a cloud-based computing system over a network.

* * * * *